(12) United States Patent
Choi

(10) Patent No.: US 6,973,850 B2
(45) Date of Patent: Dec. 13, 2005

(54) TRANSMISSION GEAR SHIFT LEVER DEVICE HAVING A VARIABLE SELECT LEVER RATIO

(75) Inventor: Yong-Dal Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 176 days.

(21) Appl. No.: 10/329,238

(22) Filed: Dec. 23, 2002

(65) Prior Publication Data
US 2004/0031345 A1    Feb. 19, 2004

(30) Foreign Application Priority Data
Aug. 13, 2002   (KR) .................. 10-2002-0047841

(51) Int. Cl.⁷ .................. B60K 20/00; B60K 41/22; F16C 1/10; G05G 9/00; F16D 67/00
(52) U.S. Cl. .............. 74/473.15; 74/473.24; 74/473.28; 74/483 R; 74/518; 74/523; 74/525; 192/3.57
(58) Field of Search .............. 74/473.15, 473.18, 74/473.21–473.24, 473.28, 473.34, 481, 74/483 R, 516, 518, 523, 525; 192/3.57, 192/3.62, 3.63

(56) References Cited

U.S. PATENT DOCUMENTS

| | | | |
|---|---|---|---|
| 3,998,110 A * | 12/1976 | O'Brien et al. .......... 74/473.22 |
| 4,355,543 A | 10/1982 | Ikemoto et al. |
| 4,561,325 A * | 12/1985 | Jester .................. 74/745 |
| 4,569,247 A | 2/1986 | Inui et al. |
| 4,621,721 A | 11/1986 | Czerwick et al. |
| 5,105,676 A | 4/1992 | Sabel et al. |
| 5,144,853 A * | 9/1992 | Giudici ................ 74/473.15 |
| 5,178,042 A * | 1/1993 | Moroto et al. .......... 477/65 |
| 5,560,253 A | 10/1996 | Ishikawa et al. |
| 5,566,581 A | 10/1996 | Smale et al. |
| 5,651,290 A * | 7/1997 | Osborn et al. .......... 74/473.22 |
| 5,802,922 A | 9/1998 | Kawai et al. |
| 5,845,535 A | 12/1998 | Wakabayashi et al. |
| 5,845,536 A * | 12/1998 | Certeza ................ 74/473.26 |
| 6,006,623 A * | 12/1999 | Sugiyama .............. 74/473.15 |
| 6,148,686 A | 11/2000 | Kataumi |
| 6,170,352 B1 * | 1/2001 | Neubauer et al. ........ 74/473.11 |
| 6,401,564 B1 | 6/2002 | Lee |
| 6,422,106 B1 | 7/2002 | Lee |

FOREIGN PATENT DOCUMENTS

EP          1 186 805          3/2002

* cited by examiner

Primary Examiner—David A. Bucci
Assistant Examiner—Colby Hansen
(74) Attorney, Agent, or Firm—Morgan Lewis & Bockius LLP

(57) ABSTRACT

The transmission gear shift lever device has a variable select lever ratio adapted to accommodate most of the operating mechanisms of the conventional transmission gear shift (TGS) lever device without major design changes. The select lever ratio is a ratio of rotating angle of a select lever relative to the rotating angle of the TGS lever and can be varied during the select manipulation of the TGS lever, such that all shift stages in a 6-speed transmission can be controlled while the rotating angle of the TGS lever during the select manipulation is maintained at the same size as that of a conventional TGS lever device.

10 Claims, 13 Drawing Sheets

FIG.3
(Prior art)
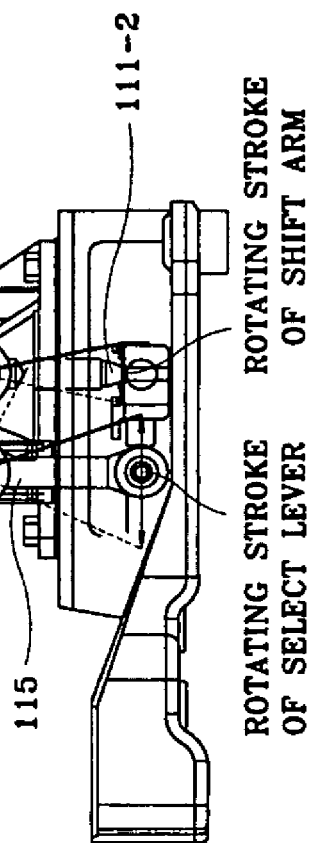
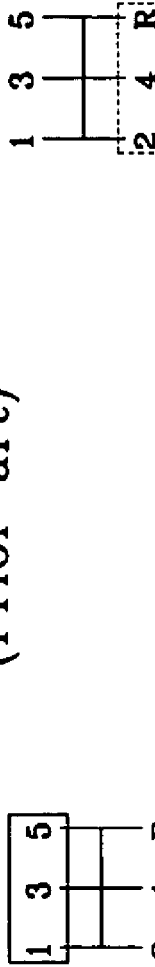
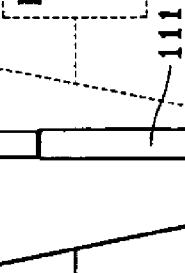
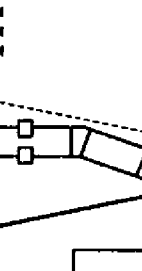
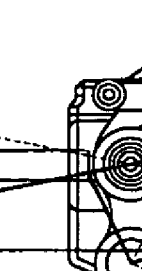

TRANSMISSION GEAR SHIFT LEVER DEVICE HAVING A VARIABLE SELECT LEVER RATIO

FIELD OF THE INVENTION

The present invention relates to a transmission gear shift (TGS) lever device for shifting gear in a manual transmission, and more particularly, to a TGS lever device used in a 6-speed manual transmission.

BACKGROUND OF THE INVENTION

FIG. 1 illustrates a manual transmission 100 according to the prior art and a TGS lever device 110 for manipulating the manual transmission 100. The TGS lever device 110 moves the TGS lever 111 horizontally to perform a gear select operation and moves back and forth to perform a gear shift operation. The gear select operation and the gear shift operation are transmitted to the transmission 100 via a gear select cable 112 and a gear shift cable 113 to select a desired gear shifting stage (gear select operation) and then to perform a gear shifting operation (gear shift operation).

FIGS. 2 and 3 illustrate a front view and a side view of the TGS lever 110. A TGS lever housing 114 is fixed to the floor of a vehicle body and the TGS lever 111 is centrally formed with a pivot ball 111-1 and rotatably coupled to the TGS lever housing 114. The pivot ball 111-1 of the TGS lever 111 is protrusively formed thereunder with a shift arm 111-2 to pull and push the gear shift cable 113 (FIG. 1). The pivot ball 111-1 is protrusively mounted at the left side thereof with a select arm 111-3 to change the motion direction via a select lever 115 and to push and pull the gear select cable 112 (FIG. 1).

As a result, when the TGS lever 111 is manipulated to the left, a position for shifting to the first stage (first gear) and the second stage (second gear) can be selected as shown in FIG. 2. When the TGS lever 111 is manipulated to the right, a position for shifting to the fifth stage (fifth gear) and the reverse stage (reverse gear) can be selected. In the neutral state, a state for manipulating to the third and fourth stages (third and fourth gears) is selected as a default. Under the state where the gear select operation is performed, the gear shift operation is performed by manipulating the TGS lever 111 back and forth to shift to a desired shift stage or gear.

FIG. 3 illustrates a rotating stroke of the select lever 115 and a rotating stroke of the shift arm 111-2 when the shift operation and the select operation are performed. The rotating stroke of he select lever 115 is transmitted to the transmission via the gear select cable 112 (FIG. 1) to select a desired shift rail, and the rotating stroke of the shift arm 111-2 is transmitted to the transmission via the gear shift cable 113 (FIG. 1) to linearly move the selected shift rail and to mesh gears at the shift stages desired by the shift fork.

However, such a TGS lever device does not operate smoothly on more recently-developed 6-speed transmissions. In other words, FIG. 4 illustrates select states of a TGS lever device with a shift lever manipulating pattern having 1–2, 3–4 and 5–6 stages oppositely arranged and a R stage located on the left. FIG. 5 illustrates select states of a TGS lever device with a shift lever manipulating pattern where the R stage is located on the right. However, problems may occur in both of the two TGS lever devices shown in FIGS. 4 and 5 because of the excessive rotating angles to the left and right sides.

As illustrated in FIG. 6, where excessive rotating angles of a gear shift lever are required for a gear select operation, problems arise in that interference with a parking brake lever 130 installed nearby or a lack of a sufficient space from the parking brake decreases the manipulability of a shift lever 111. In this case, the gear shift lever may interfere with the body of a driver or a passenger, thereby causing inconvenience to the driver or passenger. This is especially problematic where the gear shift lever is positioned adjacent to the parking brake between the vehicles two front seats, as shown in FIG. 6.

SUMMARY OF THE INVENTION

The present invention provides a transmission gear shift lever device having a variable select lever ratio adapted to accommodate most of the operating mechanisms of a conventional TGS lever device without major design changes while incorporating a variable select lever ratio. This variable select lever ratio is a ratio of a rotating angle of a select lever relative to the rotating angle of a TGS lever and can be varied during the select manipulation of the TGS lever, such that all shift stages in a 6-speed transmission can be controlled while the rotating angle of the TGS lever during the select manipulation is maintained at the same size as that of the conventional TGS lever device.

In accordance with an embodiment of the present invention, the transmission gear shift lever device having a variable select lever ratio, includes an extender mounted at a select arm of the gear shift lever, a select lever movably coupled on the extender for varying rotation direction of the select arm, and linear moving means for selectively and linearly moving the select lever along a protruding direction of the select arm.

According to the invention there is provided a transmission gear shift (TGS) lever device for selecting and shifting between gears in a manual transmission. The TGS lever device includes a gear shift lever, a select arm or extender, and a linear mover. The gear shift lever is preferably pivotable about a TGS lever housing at a pivot ball. The select arm is coupled to the gear shift lever near an end of the select arm. The select arm is preferably coupled to the gear shift lever at the pivot ball and protrudes away from the TGS lever. The select lever is slideably coupled to the select arm near an end of the select lever. The linear mover is configured for translating the select lever along the select arm to adjust a rotating stroke of the gear shift lever. The rotating stroke is used to shift between gears, i.e., the rotating stroke of the gear shift lever is converted into a gear shift by a gear select cable coupled to the select lever. In use the linear mover translates the select lever in response to a selection from a driver.

The linear mover preferably includes a piston formed at a rotating axle of the select lever configured to force the rotating axle of the select lever translate along the select arm. The also preferably includes an operation cylinder configured to guide the piston for reciprocal linear movement, and a spring for biasing the piston in a direction opposite to the translation. An oil pressure providing means is used for selectively supplying the oil pressure to the operation cylinder.

The oil pressure providing means includes a clutch master cylinder, an accumulator, and an oil passage switching valve for switching between a state where oil pressure of the oil pressure generating means is supplied to the operation cylinder and a state where the oil pressure is supplied to the accumulator. Alternatively, the oil pressure generating means is a clutch master cylinder operated by manipulation of a clutch pedal by a driver. The oil pressure providing means preferably includes an oil pressure pump, and an oil pressure valve for switching between a state where oil pressure generated from the oil pressure pump is supplied to the operation cylinder and a state where the oil pressure of the operation cylinder is discharged.

BRIEF DESCRIPTION OF THE DRAWINGS

For a better understanding of the nature and objects of the invention, reference should be made to the following detailed descriptions taken in conjunction with the accompanying drawings in which:

FIG. 3 is a side view of a TGS lever device according to the prior art, illustrating select and shift operations;

FIG. 5 is applied to a vehicle;

DETAILED DESCRIPTION OF THE INVENTION

Figure 1:
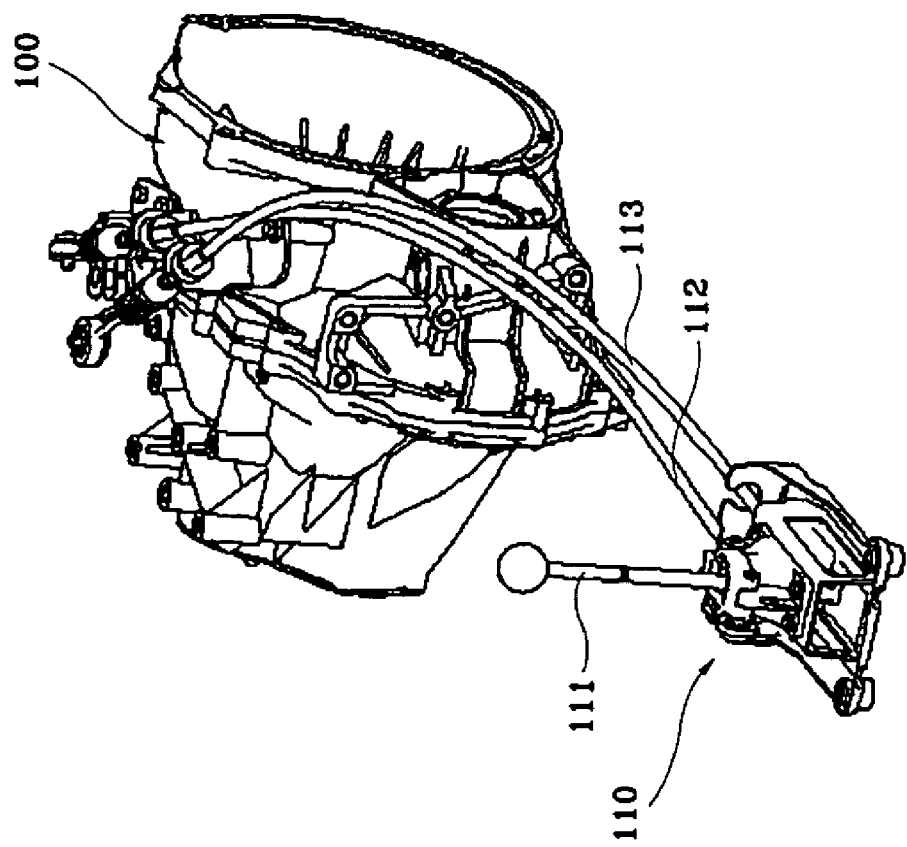
FIG. 1 illustrates a connection state between a transmission and a conventional TGS lever device.
Figure 2:
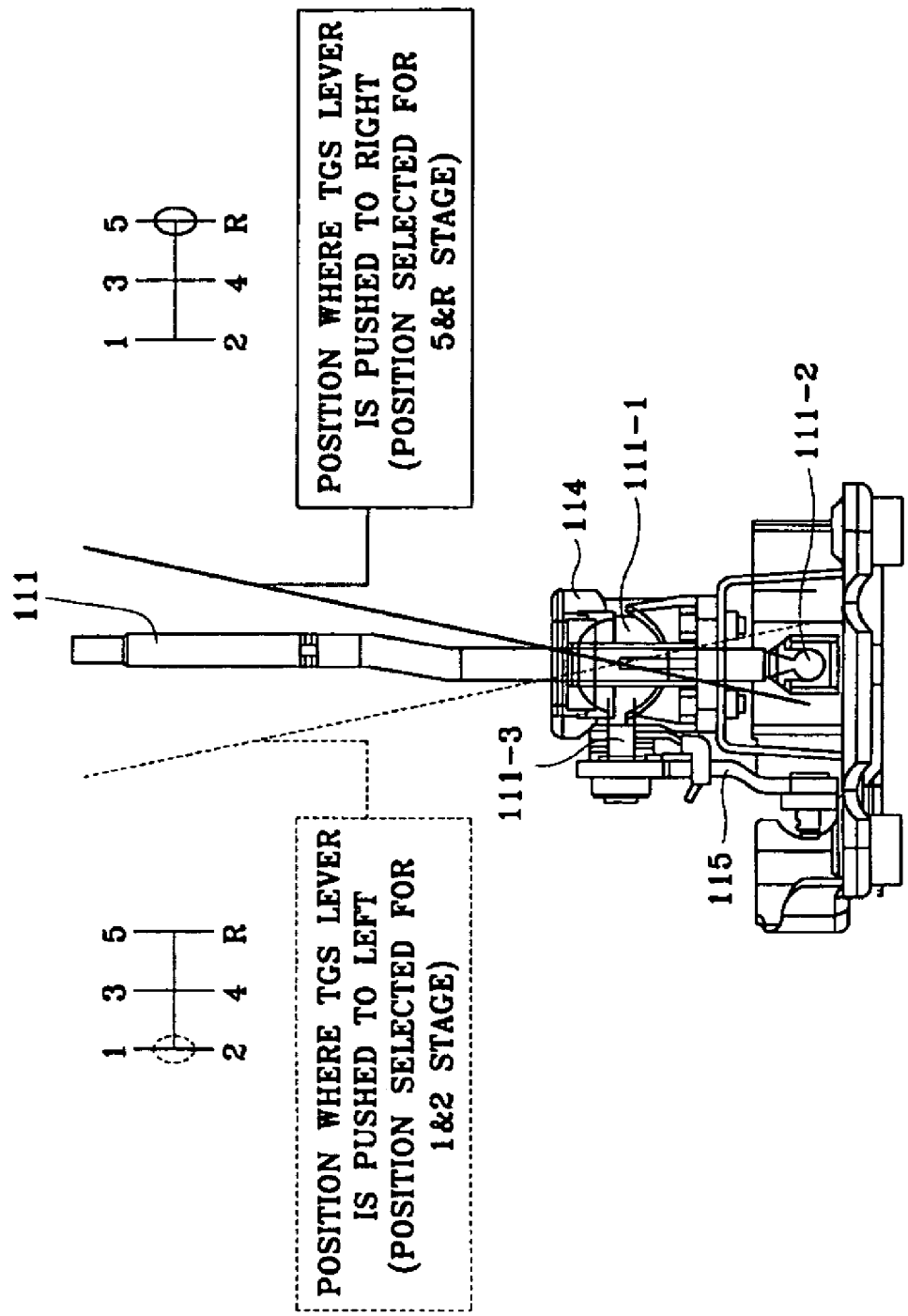
FIG. 2 is a front view of a TGS lever device according to the prior art, illustrating a select operation.
Figure 4:
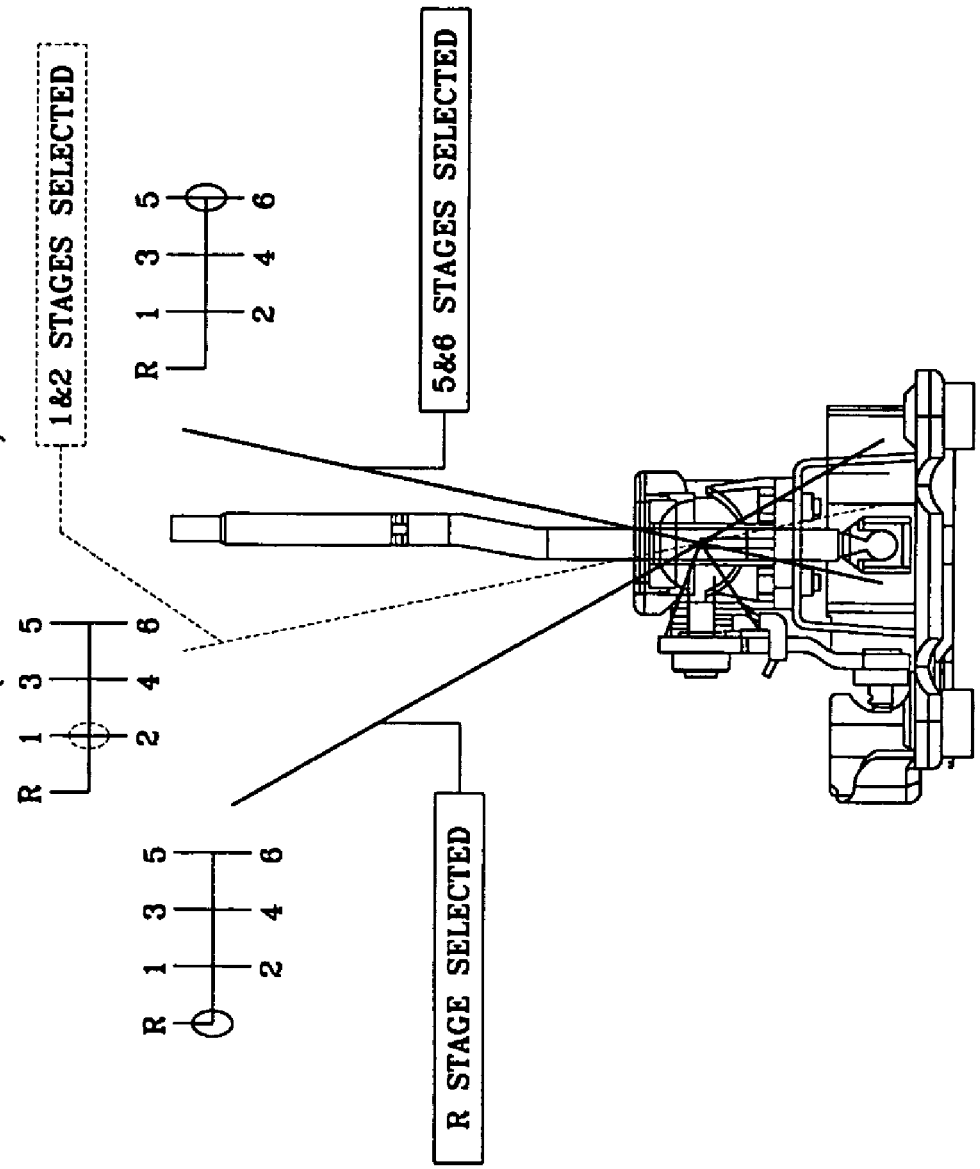
FIG. 4 is a front view illustrating an operation state when a TGS lever device according to the prior art is applied to a 6-speed transmission with the R stage positioned on the left side.
Figure 5:
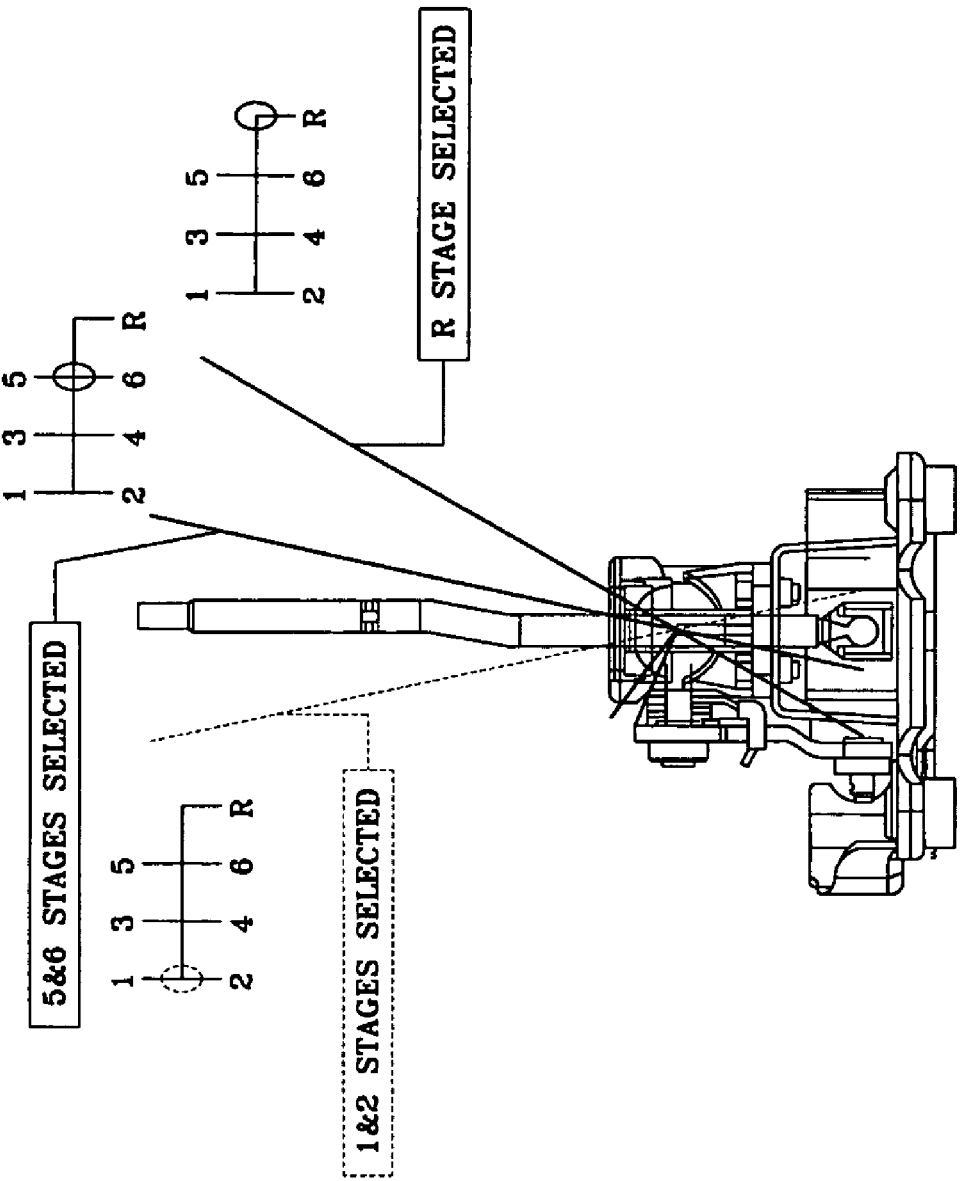
FIG. 5 is a front view illustrating an operation state when a TGS lever device according to the prior art is applied to a 6-speed transmission with the R stage positioned on the right side.
Figure 6:
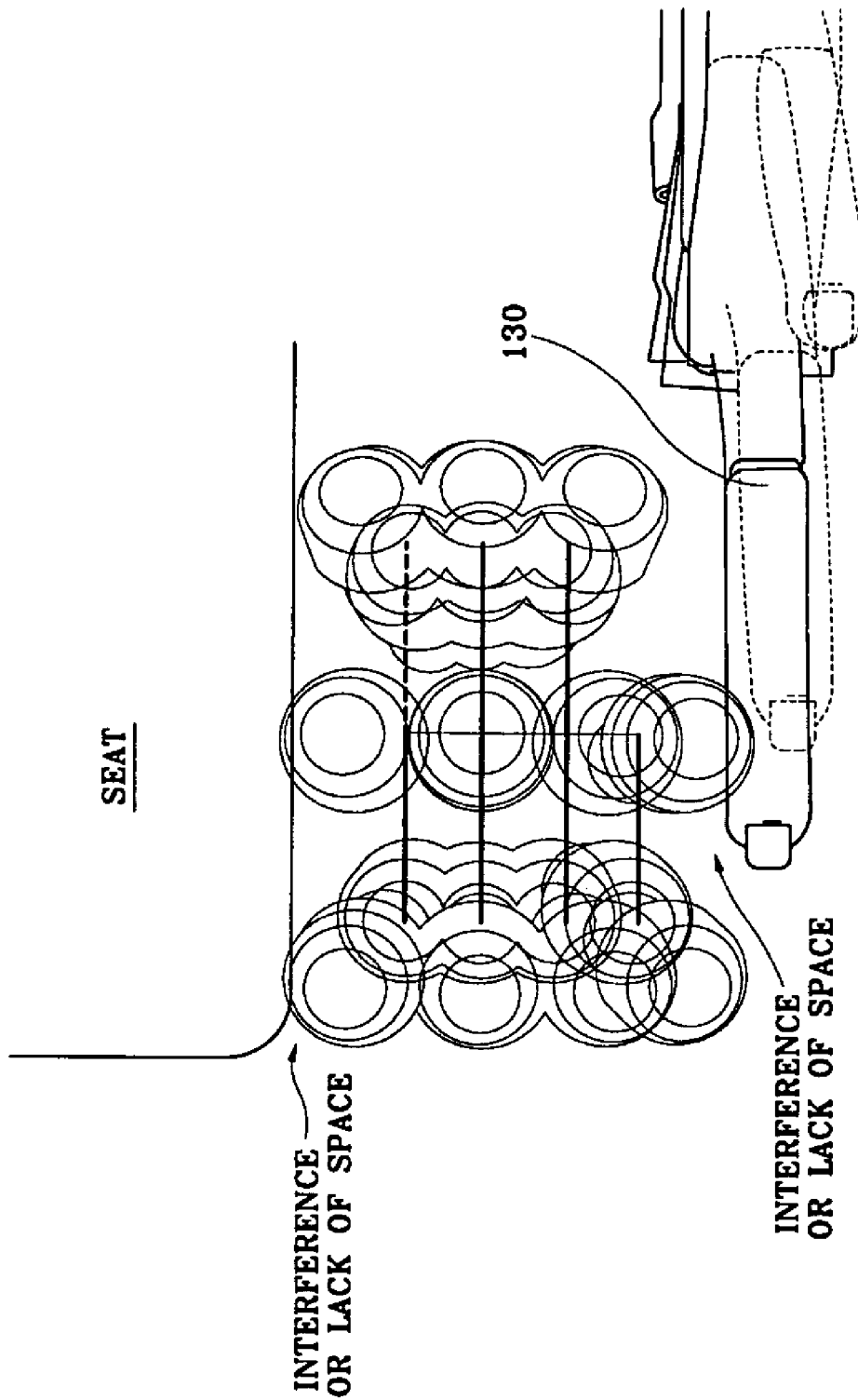
FIG. 6 is an explanatory drawing illustrating an interference state with a parking brake lever when a 6-speed TGS lever device having an operation state as in FIG. 4

The present invention alters the contact point between a select arm of a TGS lever and a select lever to vary a select lever ratio. The select lever ratio is the ratio of a rotating angle of the select lever relative to a rotating angle of the TGS lever when the TGS lever is manipulated to select a gear, where the rotating angle of the select lever becomes larger than that of the conventional lever when necessary to obtain a rotating stroke needed for selection of additional shift stages or gears.

For this purpose, an extender 1 is formed at the select arm of the TGS lever along the protruding direction of the select arm (hereinafter, a select arm formed with the extender 1 is referred to as reference numeral 3.). The select lever 115 is movably coupled to the extender 1 to convert and receive the rotating motion of the select arm 3. Linear moving means is provided to selectively and linearly move the select lever 115 along the protruding direction of the select arm 3.

Figure 7:
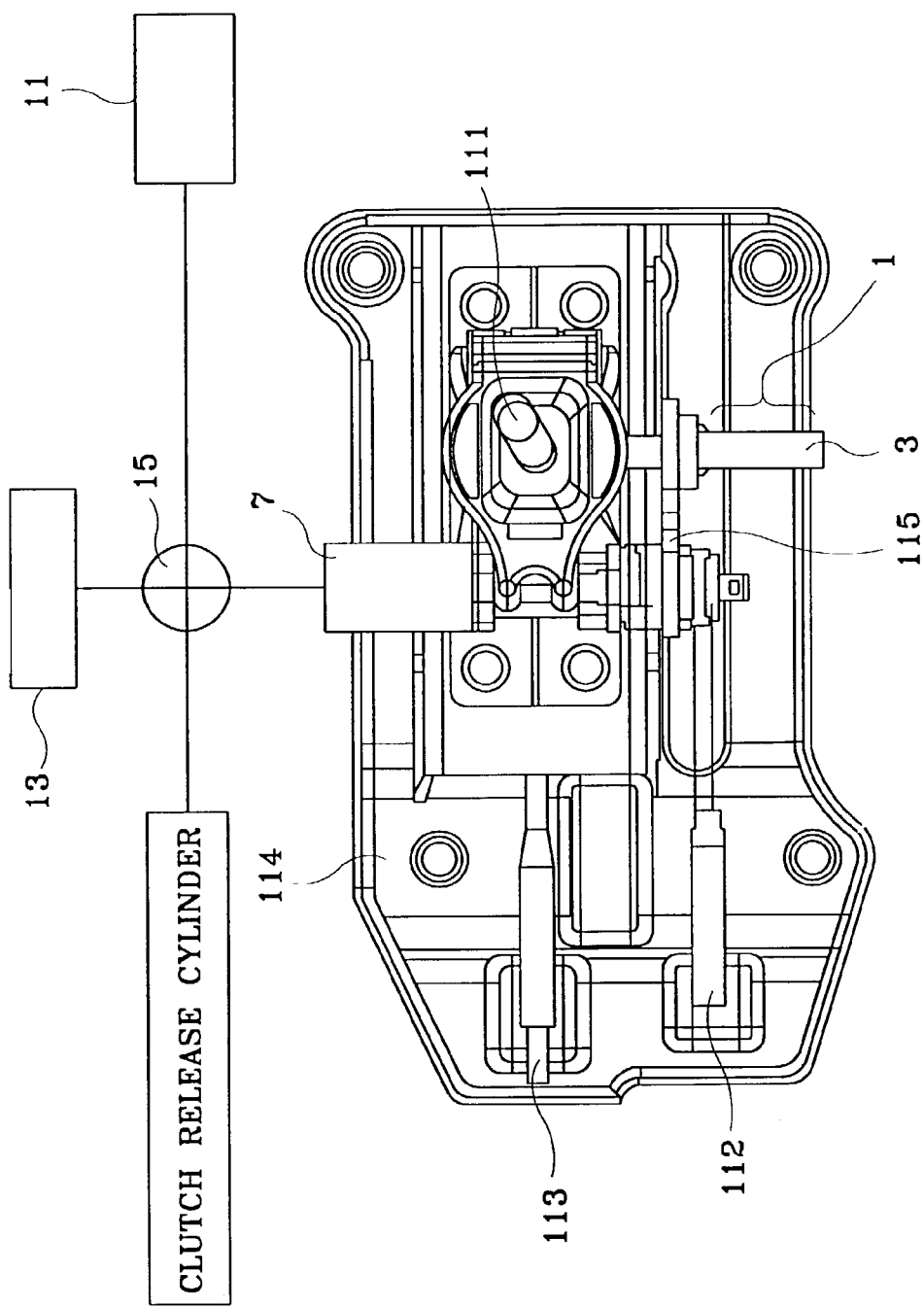
FIG. 7 is a structural drawing illustrating a TGS lever device having a variable select lever ratio, according to the present invention.
Figure 8:
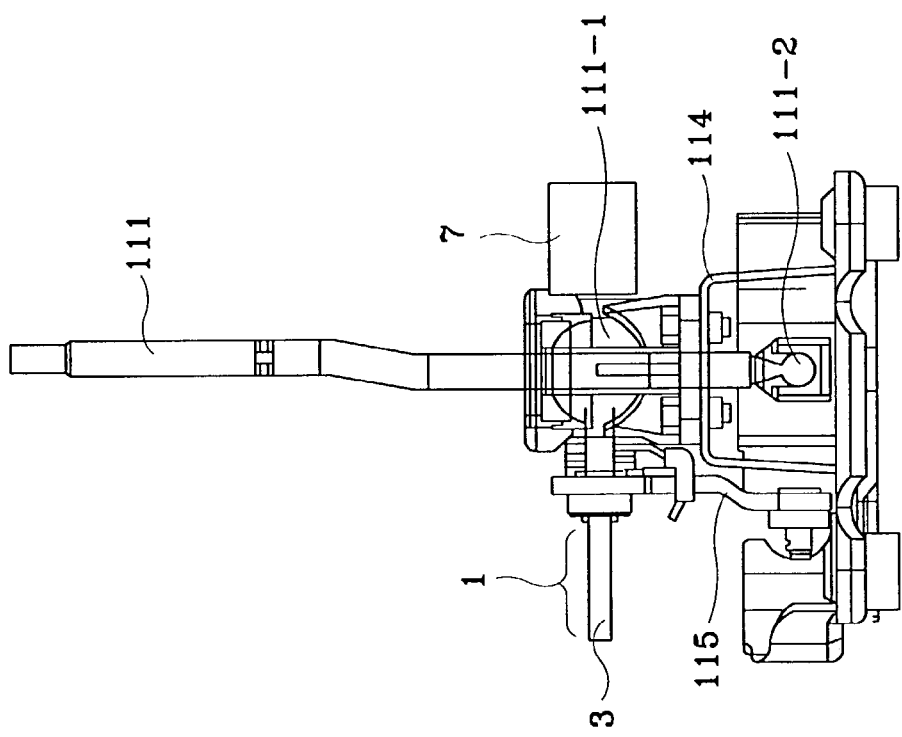
FIG. 8 is a front view of the TGS lever device illustrated in FIG. 7.
Figure 9:
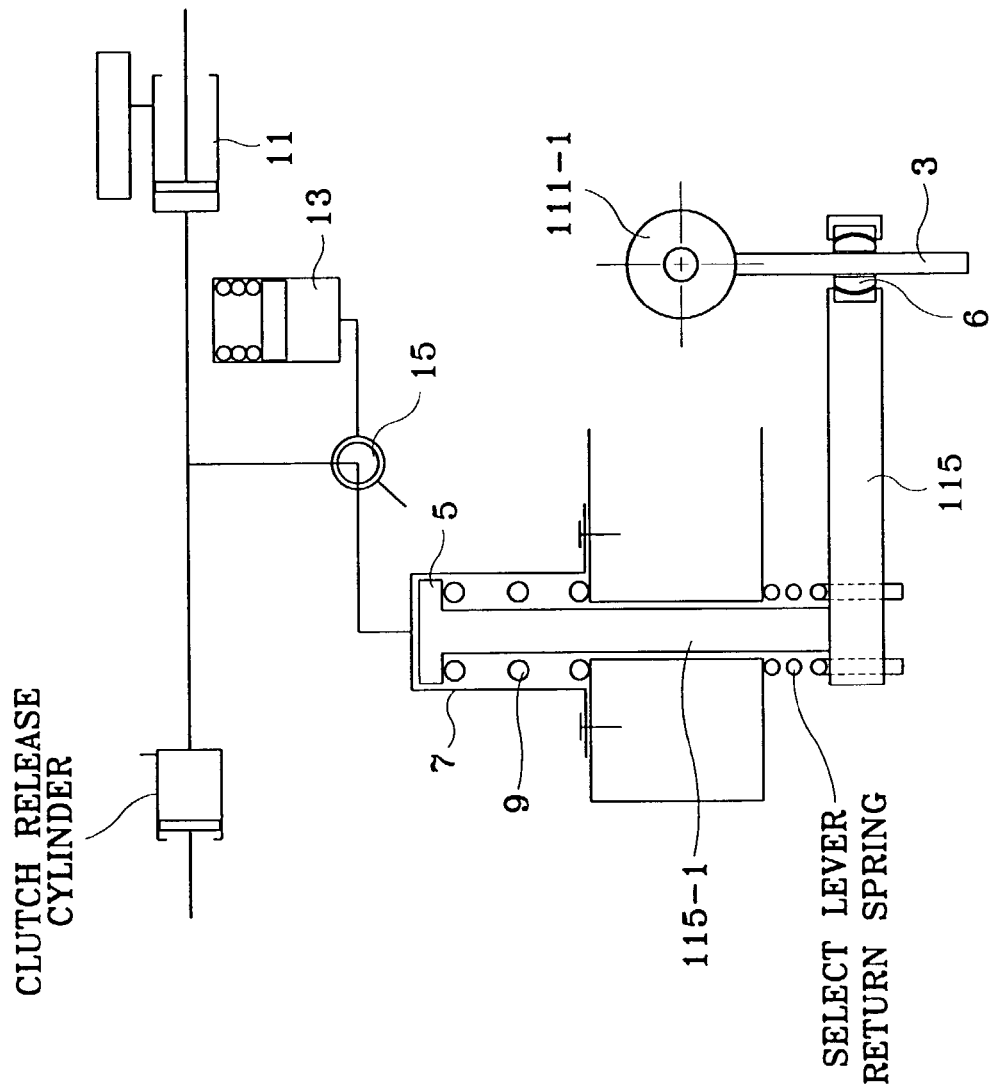
FIG. 9 is a schematic drawing illustrating the principal structure of the TGS lever device of FIG. 7, and illustrating the practical state of a general shifting manipulation.
Figure 10:
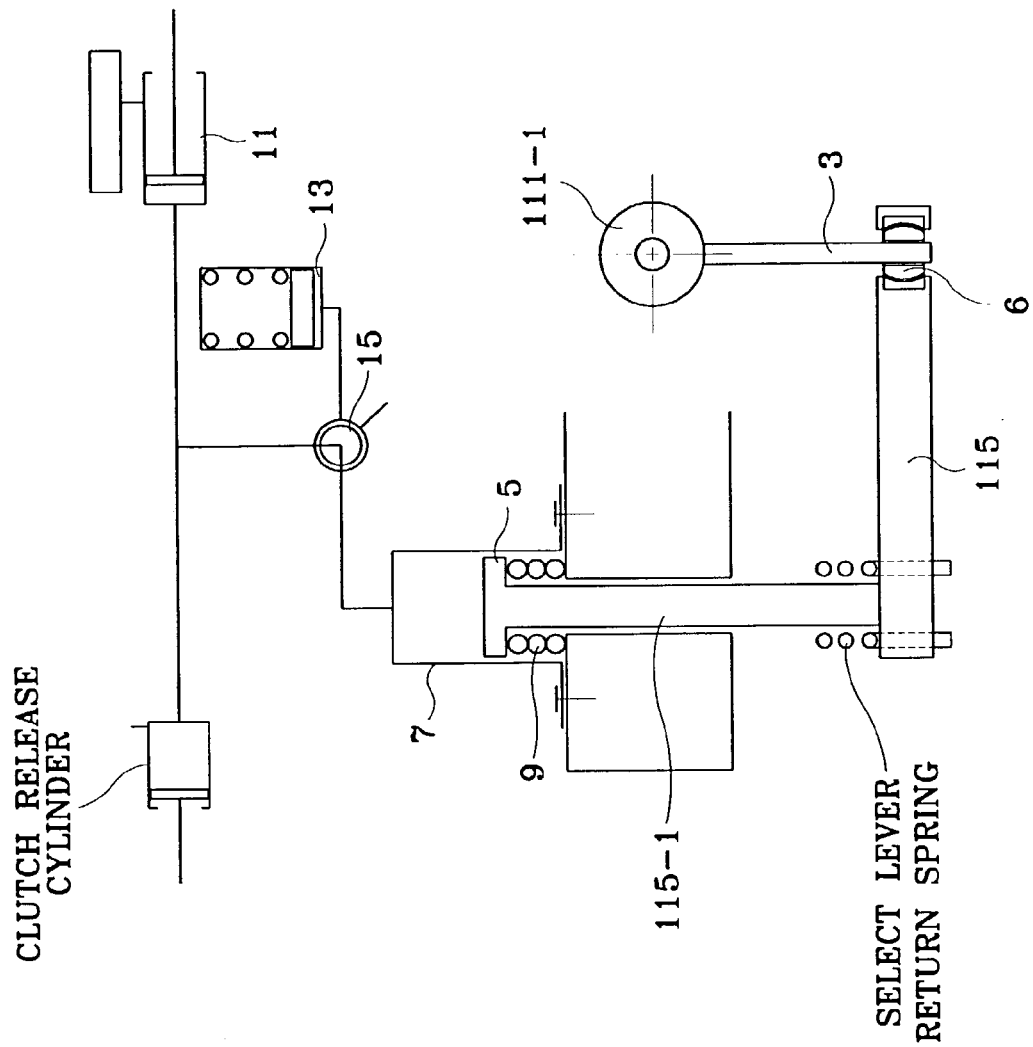
FIG. 10 is a schematic drawing illustrating the principal structure of the TGS lever device of FIG. 7, in particular a state where R stage shifting is possible.

As shown in FIGS. 9 and 10, the select lever 115 and the select arm 3 are connected by a pillow ball 6 which in turn absorbs both the linear displacement of the two members and the spatial angular displacement. The linear movement means includes a piston 5 formed at a rotating axle 115-1 of the select lever 115 for forcing the rotating axle 115-1 of the select lever 115 in the protruding direction of the select arm 3 relative to a TGS housing 114 (FIG. 7). An operation cylinder 7 is secured at the TGS housing 114 for guiding the piston 5 for reciprocal linear movement. A spring 9 is provided for resiliently supporting and biasing the piston 5 in a direction opposite to that of the protruding direction of the select arm. Oil pressure providing means are provided for selectively supplying oil pressure to the operation cylinder 7.

Figure 11:
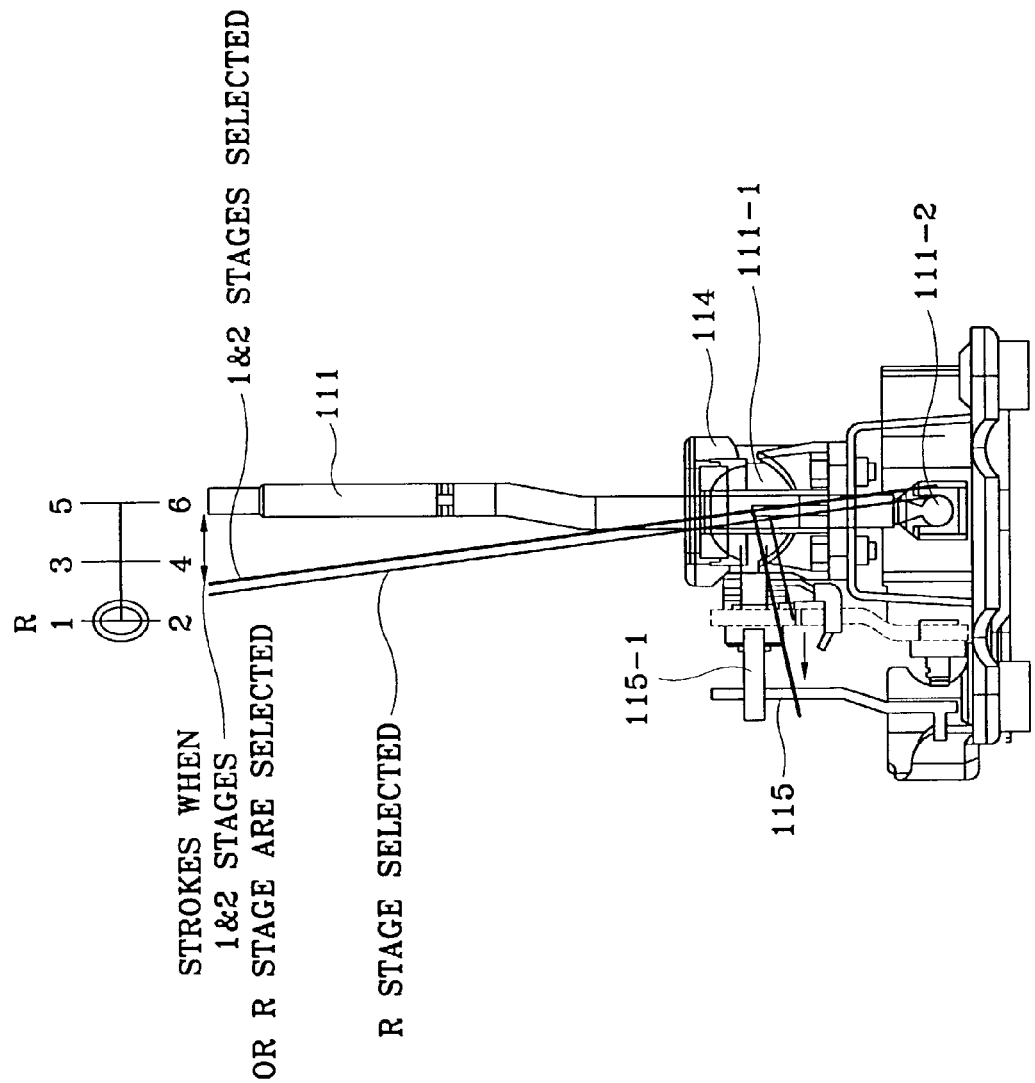
FIG. 11 is a front view of a TGS lever device, according to the present invention, illustrating a select state for R stage shifting.
Figure 12:
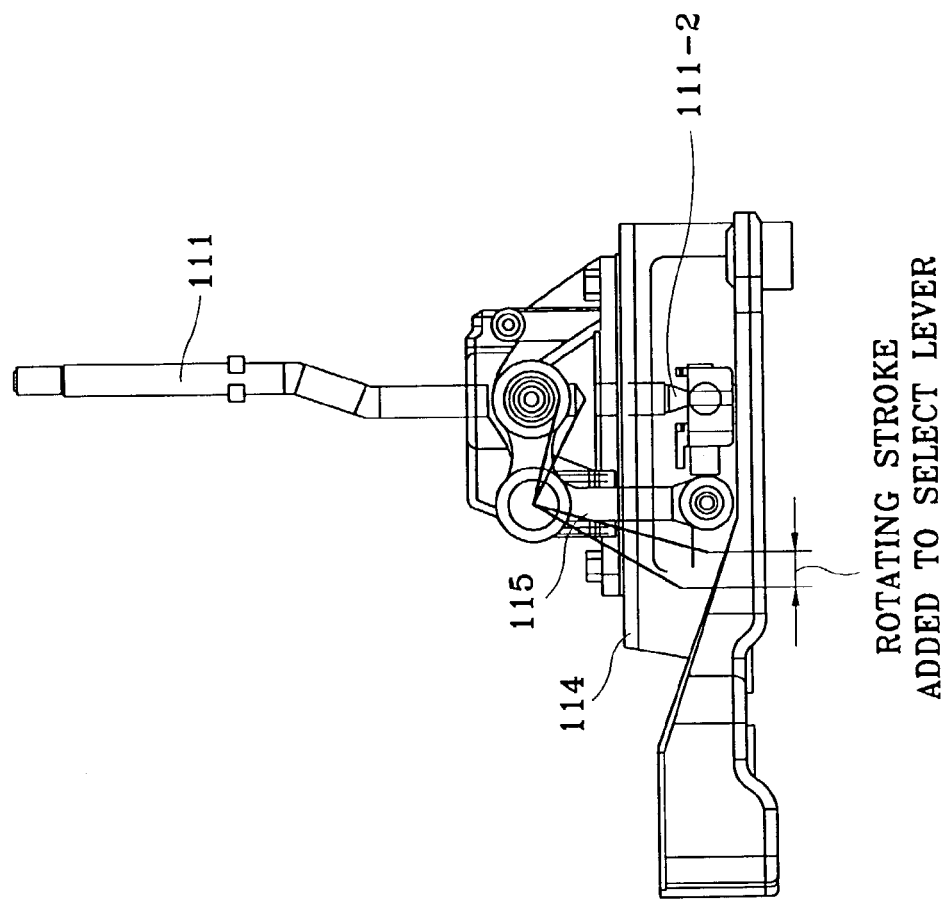
FIG. 12 is a side view of a TGS lever device, according to the present invention, illustrating a select operation.

The rotating axle 115-1 of the select lever itself is linearly moveable along the protruding direction of the select arm 3 together with the select lever 115, and is biased to a starting position by the spring 9. As a result, when the select lever 115 is moved on the extender 1 (FIG. 7) along the protruding direction of the select arm 3 causing the contact position between the select lever 115 and the select arm 3 to be distanced from a pivot ball 111-1 of the TGS lever, the length of the contact position (position of pillow ball 6) between the select lever 115 and the select arm 3 is lengthened from the pivot ball 111-1 when the select of the TGS lever is manipulated to thereby lengthen the rotating displacement of the pillow ball 6 relative to the select manipulation angle of the same TGS lever 111. As a result, the rotating stroke of the select lever 115 is increased to lengthen the stroke of select cable 112 within a preset scope, and by way of the stroke of the extended select cable 112, additional shift stages can be manipulated (See FIGS. 11 and 12).

Although the present invention has selected the additional shift stage or gear as the R stage or gear for reverse motion, it should be apparent that other shift stages or gears can be similarly selected. Additionally, other shift stages or gears (by way of example, a 7-speed gear or the like) can be introduced for easy application when selecting gear shift stages such as R to 7 speed or the like.

The oil pressure providing means in the first embodiment of the present invention includes: a clutch master cylinder 11 which is an oil pressure generating means for generating oil pressure, an accumulator 13 for storing pressurized oil, and an oil passage switching valve 15 for switching oil pressure between a state where oil pressure of the oil pressure generating means is supplied to the operation cylinder 7 and a state where the oil pressure is supplied to the accumulator 13.

Figure 13:
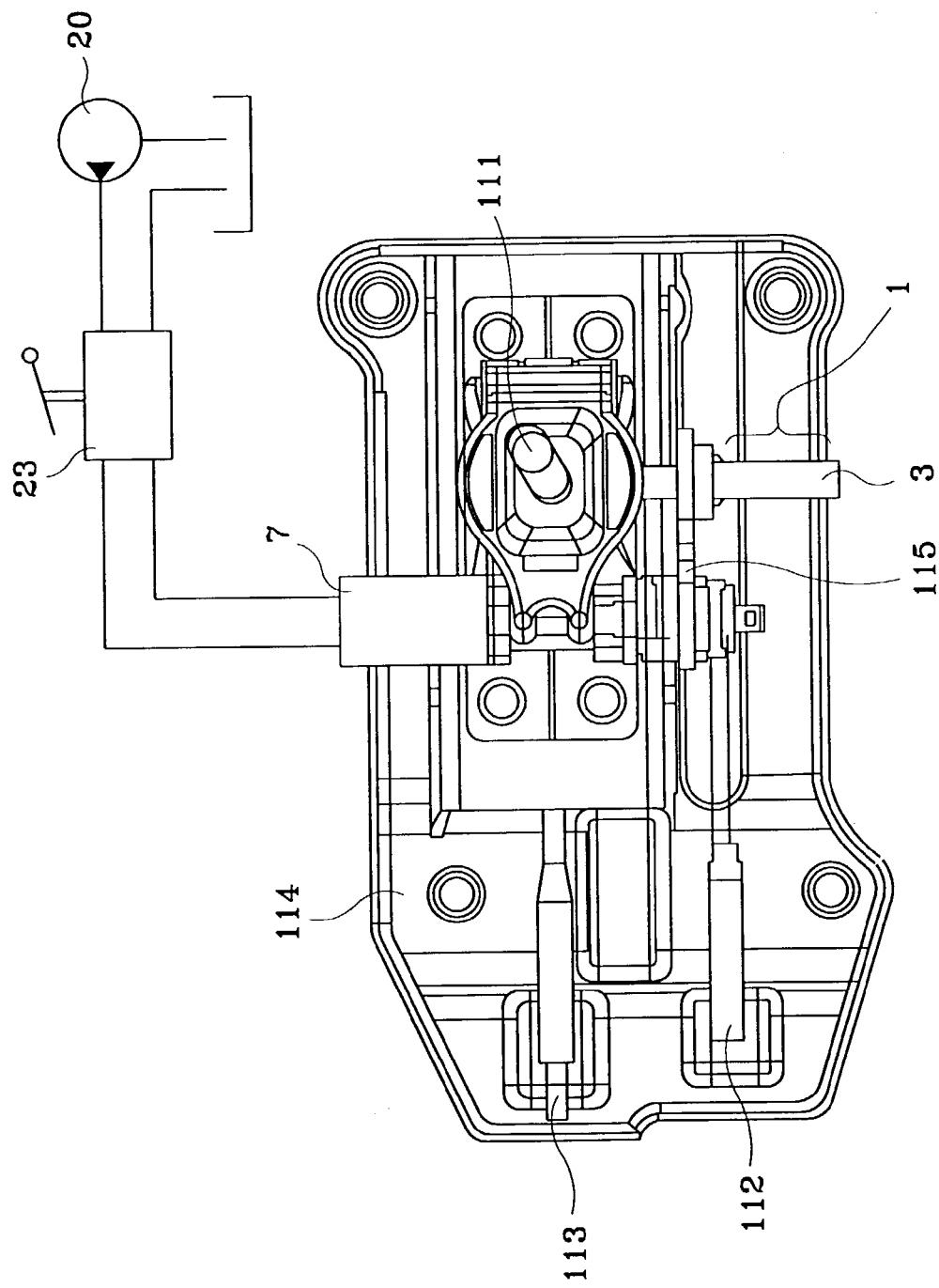
FIG. 13 is a structural drawing illustrating another embodiment of the present invention.

In another embodiment shown in FIG. 13, the oil pressure providing means includes an oil pressure pump 20 and an oil pressure valve 23 for switching between a state where the oil pressure generated from the oil pressure pump 20 is supplied to the operation cylinder 7 and a state where oil pressure of the operation cylinder 7 is discharged, such that an independent operation can be performed relative to the manipulation of the clutch pedal by a driver.

The oil passage switching valve 15 (FIGS. 9 and 10) or the oil pressure valve 23 (FIG. 13) can be installed at a place where it is convenient for the driver to manipulate.

Hereinafter, the operation of the present invention will be described, by way of example, where the clutch master cylinder 11 is the oil pressure generating means and the oil pressure providing means is the accumulator 13 and the oil pressure switching valve 15 is adopted, as per FIGS. 9 and 10.

A driver can select a shifting stage from the 1-speed to the 6-speed shift stage just like in the prior art and can manipulate the shifting operations in a state shown in FIG. 9. The oil pressure of the clutch master cylinder 11 generated by the clutch pedal manipulated by the driver acts on a clutch release cylinder to perform the original clutch operation. At the same time, pressurized residue oil is accommodated by the accumulator 13 to emulate the same feel as if the clutch master cylinder 11 is in the same state as where the pressurized oil is supplied to the operation cylinder 7, such that the driver cannot feel the difference in operation of the clutch master cylinder 11.

When the driver depresses the clutch pedal for reverse shifting while the driver uses the oil passage switching valve 15 to supply the oil pressure to the operation cylinder 7, the oil pressure generated from the clutch master cylinder 11 is supplied to the operation cylinder 7 to move the select lever 115 to the protruding direction of the select arm 3 via the piston 5, whereby the pillow ball 6 is moved to the tip end of the extender 1 (See FIG. 10).

As a result, the rotating displacement of the pillow ball 6 generated by the select manipulation of the TGS lever 111 is increased compared with that of the pillow ball 6 before the movement to increase the rotating stroke of the select lever 115. This supplies the additional rotating stroke to the gear select cable. Subsequently, a shift rail can be selected at the transmission for shifting to the R stage or gear by the additional rotating stroke of the select cable 112. Subsequently, when a driver manipulates the TGS lever 111 while the R stage shift rail is selected as above, the R stage shift rail is operated to complete the R stage shifting.

Again, when the driver manipulates the oil passage switching valve 15 to allow the pressurized oil supplied to the operation cylinder 7 to be discharged, the piston 5 is returned to the starting position (FIG. 9) by the spring 9 to return the select lever 115 to the starting position, and the pillow ball 6 is returned to the starting position to enable gear shift selection to the conventional 1–6 shift stages or gears.

As apparent from the foregoing, there is an advantage in the transmission gear shift lever device having a variable select lever ratio thus described according to the present invention in that most of the operating mechanisms of the conventional TGS lever device are accommodated without major design changes while providing a variable select lever ratio. The select lever ratio is a ratio of rotating angle of a select lever relative to the rotating angle of the TGS lever. This ratio can be varied during the select manipulation of the TGS lever, such that all shift stages in a 6-speed transmission can be controlled while the rotating angle of the TGS lever during the select manipulation is maintained at the same size as that of the conventional TGS lever device.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A transmission gear shift (TGS) lever device having a variable select lever ratio, the device comprising:
    an extender mounted on a select arm of a gear shift lever;
    a select lever movably coupled to said extender for varying rotation movement of said select arm;
    linear moving means for selectively and linearly moving said select lever along a protruding direction of said select arm;
    a piston formed at a rotating axle of said select lever for forcing the rotating axle of said select lever along the protruding direction of said select arm relative to a transmission gear shift housing;
    an operation cylinder secured at said transmission gear shift housing for guiding said piston for reciprocal linear movement; and
    a spring from resiliently supporting said piston in an opposite direction to the protruding direction of said select arm;
    an oil pressure providing means for selectively supplying said oil pressure to said operation cylinder, wherein said oil pressure providing means comprises:
    a clutch master cylinder;
    an accumulator; and
    an oil passage switching valve for switching between a state where oil pressure of said oil pressure generating means is supplied to said operation cylinder and a state where the oil pressure is supplied to said accumulator.

2. The device as defined in claim 1, wherein said oil pressure generating means is a clutch master cylinder operated by manipulation of a clutch pedal by a driver.

3. A transmission gear shift (TGS) lever device comprising:
    a gear shift lever;
    a select arm coupled to said gear shift lever near an end of said select arm;
    a select lever slideably coupled to said select arm near an end of said select lever;
    a linear mover for translating said select lever along said select arm to adjust a rotating stroke of said gear shift lever; and
    a piston formed at a rotating axle of said select lever configured to force the rotating axle of said select lever translate along said select arm;
    an operation cylinder configured to guide said piston for reciprocal linear movement; and
    a spring for biasing said piston in a direction opposite to said translation;
    an oil pressure providing means for selectively supplying said oil pressure to said operation cylinder, wherein said oil pressure providing means comprises:
    a clutch master cylinder;
    an accumulator; and
    an oil passage switching valve for switching between a state where oil pressure of said oil pressure generating means is supplied to said operation cylinder and a state where the oil pressure is supplied to said accumulator.

4. The transmission gear shift lever device of claim 3, further comprising a gear select cable coupled to said select lever for converting said rotating stroke of said gear shift lever into a gear shift.

5. The transmission gear shift lever device of claim 3, wherein said gear shift lever is pivotable about a TGS lever housing at a pivot ball.

6. The transmission gear shift lever device of claim 5, wherein said select arm is coupled to said gear shift lever at said pivot ball.

7. The transmission gear shift lever device of claim 5, wherein said select arm protrudes away from said TGS lever.

8. The transmission gear shift lever device of claim 3, wherein said linear mover translates said select lever in response to a selection from a driver.

9. The transmission gear shift lever device of claim 3, wherein said oil pressure generating means is a clutch master cylinder operated by manipulation of a clutch pedal by a driver.

10. A transmission gear shift (TGS) lever device, comprising:
 a gear shift lever;
 an extender coupled to said gear shift lever near an end of said extender;
 a select lever slideably coupled to said extender near an end of said select lever;
 a linear mover for translating said select lever along said extender to adjust a rotating stroke of said gear shift lever; and
 a piston formed at a rotating axle of said select lever configured to force the rotating axle of said select lever translate along said extender;
 an operation cylinder configured to guide said piston for reciprocal linear movement; and
 a spring for biasing said piston in a direction opposite to said translation;
 an oil pressure providing means for selectively supplying said oil pressure to said operation cylinder, wherein said oil pressure providing means comprises:
 a clutch master cylinder;
 an accumulator; and
 an oil passage switching valve for switching between a state where oil pressure of said oil pressure generating means is supplied to said operation cylinder and a state where the oil pressure is supplied to said accumulator.

* * * * *